Patented May 9, 1944

2,348,321

UNITED STATES PATENT OFFICE 2,348,321

FLUORINE COMPOUNDS

Anthony F. Benning, Woodstown, N. J., and Joseph D. Park, Wilmington, Del., assignors to Kinetic Chemicals, Inc., Wilmington, Del., a corporation of Delaware No Drawing. Application December 13, 1941, Serial No. 422,870

5 Claims. (Cl. 260—583)

This invention relates to 2,2,2-trifluoroethylamine, to other aliphatic amines containing a completely fluorinated carbon atom and to a process of preparing them.

According to our invention an aliphatic chloride having a completely fluorinated carbon atom is reacted with an aqueous solution of ammonia. The aqueous ammonia solution is preferably concentrated, and the alkyl chloride preferably has less than seven carbon atoms although it may have as many as twelve. The reaction is preferably carried out at a temperature between 150°–200° C. under such pressure as is generated by carrying out the reaction in a confined space, i. e. by carrying out the reaction at constant volume.

Among the fluoro aliphatic amines which may be prepared by this reaction are 3,3,3-trifluoropropylamine, and 4,4,4-trifluorobutylamine.

The following example is exemplary of the process:

Example

About 70 parts by weight of concentrated $NH_4OH$ (28% $NH_3$) was reacted with about 55 parts by weight of $CF_3CH_2Cl$ in a steel bomb at 185° C. for six hours. 2,2,2-trifluoroethylamine was isolated by decantation and distillation and was identified. It had a boiling point of 37°–38° C. and a vapor density of 96. It has a neutralization equivalence corresponding to a formula weight of $CF_3CH_2NH_2$. The theoretical vapor density of $CH_3CH_2NH_2$ is 99 which is sufficiently close to constitute a conformation of structure.

The products of this invention find use, among other things, as dye intermediates and solvents. The process produces fluoro amines in a cheaper way than those known heretofore.

As many apparently widely different embodiments of this invention may be made without departing from the spirit and scope thereof, it is to be understood that we do not limit ourselves to the specific embodiments thereof except as defined in the appended claims.

We claim:

1. The compound represented by the formula $CF_3CH_2NH_2$.

2. The compounds represented by the formula $CF_3(CH_2)_nNH_2$, in which $n$ is a digit from 1 to 5.

3. The process of preparing 2,2,2-trifluoroethylamine which comprises reacting the compound represented by the formula $CF_3CH_2Cl$ with concentrated aqueous ammonia at a temperature of about 185° C. at constant volume.

4. The process of preparing aliphatic amines containing a completely fluorinated carbon atom which comprises reacting a compound represented by the formula $CF_3(CH_2)_nCl$, in which $n$ is from 1 to 5, with $NH_4OH$ at a temperature between about 150° and about 200° C. at superatmospheric pressure.

5. The process of preparing omega-trifluoroalkyl amines which comprises replacing the terminal chlorine atom of a compound represented by the formula $CF_3(CH_2)_nCl$, in which $n$ is a digit from the group consisting of 1 to 5, by reaction with a compound from the group consisting of $NH_3$ and $NH_4OH$.

ANTHONY F. BENNING.
JOSEPH D. PARK.